(12) United States Patent
Perez et al.

(10) Patent No.: US 7,373,174 B2
(45) Date of Patent: May 13, 2008

(54) METHOD AND APPARATUS FOR REDUCING THE EFFECT OF EMI ON RECEIVER SENSITIVITY IN A CAMERA PHONE

(75) Inventors: Ricardo Martinez Perez, Plantation, FL (US); Jose F. Rodriguez, Miami, FL (US); Philip A. Schentrup, Hollywood, FL (US)

(73) Assignee: Motorola, Inc., Schaumburg, IL (US)

( * ) Notice: Subject to any disclaimer, the term of this patent is extended or adjusted under 35 U.S.C. 154(b) by 321 days.

(21) Appl. No.: 11/027,080

(22) Filed: Dec. 31, 2004

(65) Prior Publication Data

US 2006/0148537 A1 Jul. 6, 2006

(51) Int. Cl.
*H04M 1/00* (2006.01)

(52) U.S. Cl. .............................. 455/556.1; 455/575.6; 455/575.1; 348/14.02

(58) Field of Classification Search ............. 455/575.1, 455/566, 550.1, 556.1, 557, 567, 575.6; 348/14.02, 348/335, 207.1, 207.99, 333.02, 333.11, 14.01
See application file for complete search history.

(56) References Cited

U.S. PATENT DOCUMENTS

| | | | |
|---|---|---|---|
| 2004/0027474 A1* | 2/2004 | Aoyama et al. | 348/335 |
| 2004/0097261 A1* | 5/2004 | Ujii | 455/556.1 |
| 2004/0150723 A1* | 8/2004 | Seo et al. | 348/207.1 |
| 2005/0190279 A1* | 9/2005 | Nobels | 348/333.02 |
| 2006/0044396 A1* | 3/2006 | Miyashita et al. | 348/207.99 |
| 2006/0104628 A1* | 5/2006 | Hasegawa et al. | 396/287 |
| 2006/0232662 A1* | 10/2006 | Otaka et al. | 348/14.01 |

* cited by examiner

*Primary Examiner*—Tan Trinh
(74) *Attorney, Agent, or Firm*—Scott M. Garrett

(57) ABSTRACT

A mobile communication device (100) includes a camera module (102) which provides an image stream when the camera module is active. The image stream is used to display images on a display (114) to provide a viewfinder function so that a user of the mobile communication device can see to what the camera is aimed. While the mobile communication device is operating in camera mode, the mobile communication device receives a signal at a radio receiver (104) during a time slot of a time division multiple access frame (110). To prevent the camera module from interfering with the receiver operation, the camera module operation is suspended during the receiver time slot.

12 Claims, 3 Drawing Sheets

METHOD AND APPARATUS FOR REDUCING THE EFFECT OF EMI ON RECEIVER SENSITIVITY IN A CAMERA PHONE

TECHNICAL FIELD

This invention relates in general to mobile communication devices, and more particularly to mobile communication devices having integrated camera modules capable of capturing images.

BACKGROUND OF THE INVENTION

Mobile communication devices are in widespread use throughout the world, particularly in metropolitan regions. As the popularity of these devices has increased, the cost of manufacturing them has come down. In response, manufacturers of these devices have sought to enhance them by expanding the functionality of these devices. One feature that has gained acceptance in the marketplace is the use of a camera module integrated into the mobile communication device to allow the user of the mobile communication device to take digital photographs.

When the camera mode of such a device is enabled, the display of the mobile communication device acts as a camera view finder so the user can see where the camera is presently aimed. The video signals generated by the camera module generate a substantial amount of electromagnetic interference (EMI) in the mobile communication device, which affects the sensitivity of the receiver. Therefore, when the camera mode is in use, the mobile communication device may miss receiving communication information due to the effect of the EMI. Therefore there is a need for a means by which the effect of EMI on a receiver of the mobile communication device may be reduced.

DETAILED DESCRIPTION

Figure 1:
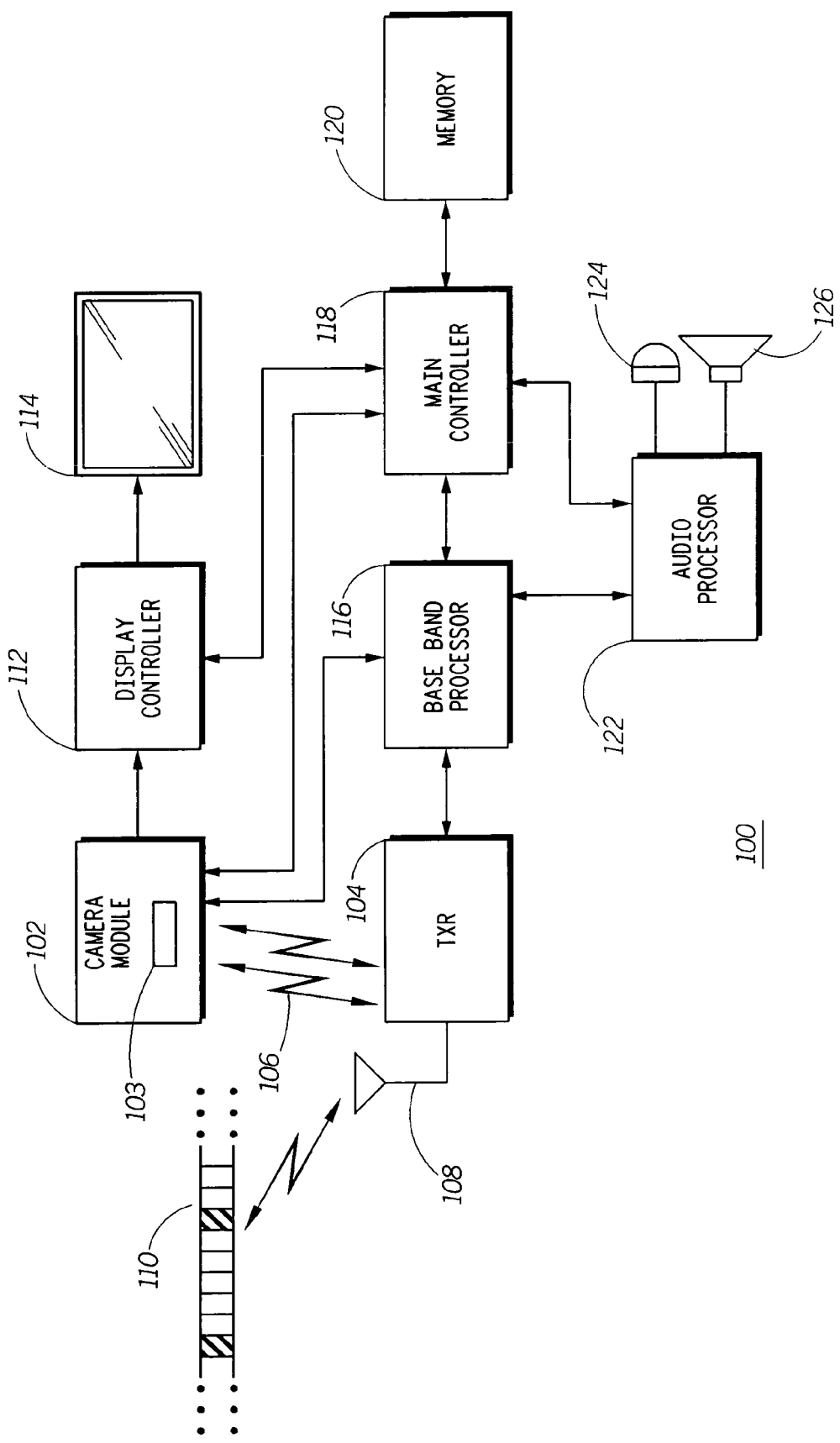
FIG. 1 shows a block diagram of a mobile communication device having a camera module, in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward. The invention solves the problem of EMI, produced by the camera module while outputting data, interfering with the reception ability of the receiver by suspending operation of the camera module at times when the mobile communication device is to receive a signal.

Referring now to FIG. 1, there is shown a block diagram 100 of a mobile communication device having a camera module 102, in accordance with an embodiment of the invention. The camera module is a digital camera subsystem that captures, buffers, and outputs digital images to a display controller 112. The display controller buffers images in a display memory causing the images to be displayed on a display 114 of the mobile communication device. During operation of the camera module 102, electromagnetic interference (EMI) 106 may be generated as result of the various video signals used and generated by the camera module. The EMI is evident on the conductors coupling the camera module to the display controller, and may be evident at, for example, a transceiver 104 of the mobile communication device. EMI may have the effect of reducing the sensitivity of the transceiver's receiver. The transceiver comprises a radio frequency transmitter and a radio frequency receiver, both of which are coupled to an antenna 108 which is used for transmitting radio signals and receiving radio signals over a timed division multiple access (TDMA) air interface 110. The TDMA air interface divides time on a frequency band into a repeating frame of time slots such that a frequency and time slot assignment define a channel. The transceiver is coupled to a baseband processor 116 which processes digital signals into a form that can be transmitted by the receiver, or, in the receive path, it processes baseband signals received and demodulated by the receiver of the transceiver into digital form for other components and sub-systems of the mobile communication device. For example, an audio processor 122 converts audio signals received at a microphone 124 into digital signals. Likewise, the audio processor coverts digital audio signals received from the baseband processor into analog audio signals to be played over a speaker 126. The baseband processor is further coupled to a controller 118 which controls operation of the mobile communication device in accordance with instruction code stored in a memory 120, for example.

In one embodiment of the invention, the baseband processor is coupled to the camera module, such as by suspend signal line 117. The baseband processor tracks the time, such as by a layer 1 timer, where layer 1 refers to layer 1 of the OSI software architecture model. When the time for a receive time slot arrives, the baseband signal processor assert a suspend signal to the camera module over suspend signal line 117. In response, the camera module suspends output while the signal is asserted. While the camera module output is suspended, it is not generating EMI, and therefore not affecting the mobile communication device's ability to receive signals at the transceiver. When the camera module suspends output, it stops outputting data to the display controller. It may also include the shutting down of the camera module to ensure no EMI is generated. Furthermore the camera module may contain a writable register 103, in which timing information may be written by the baseband processor or the main controller. Since the baseband processor has information about the signal to be received, certain statistical parameters may be written to the camera module upon commencement of operation. The statistical information may include, for example, and the average suspend signal width, the average suspend signal period. The statistical information may be used by the camera module to synchronize its output with the suspend signal.

Figure 2:
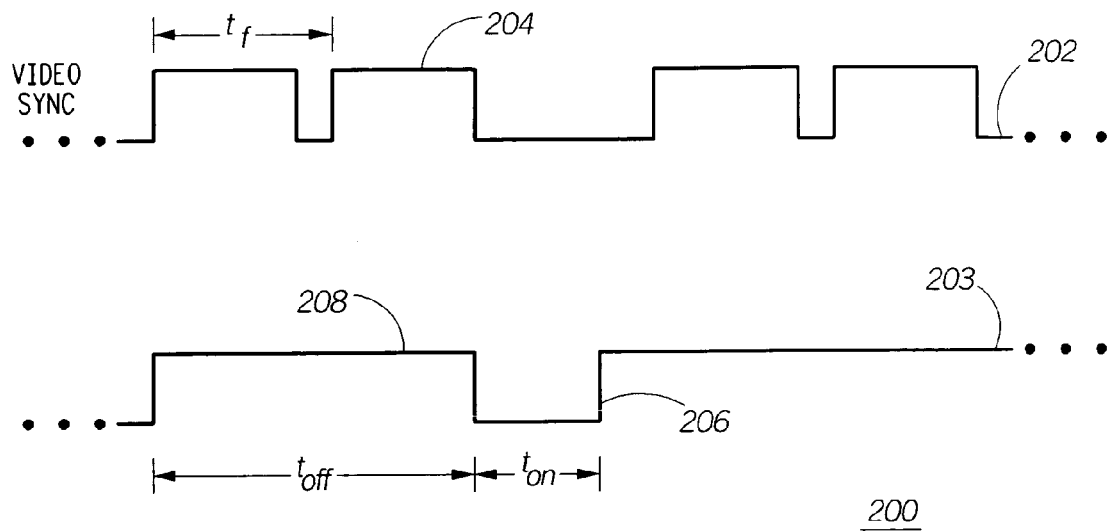
FIGS. 2-3 show a timing diagrams of signals for suppressing operation of a camera module in a mobile communication device in accordance with an embodiment of the invention.
Figure 3:
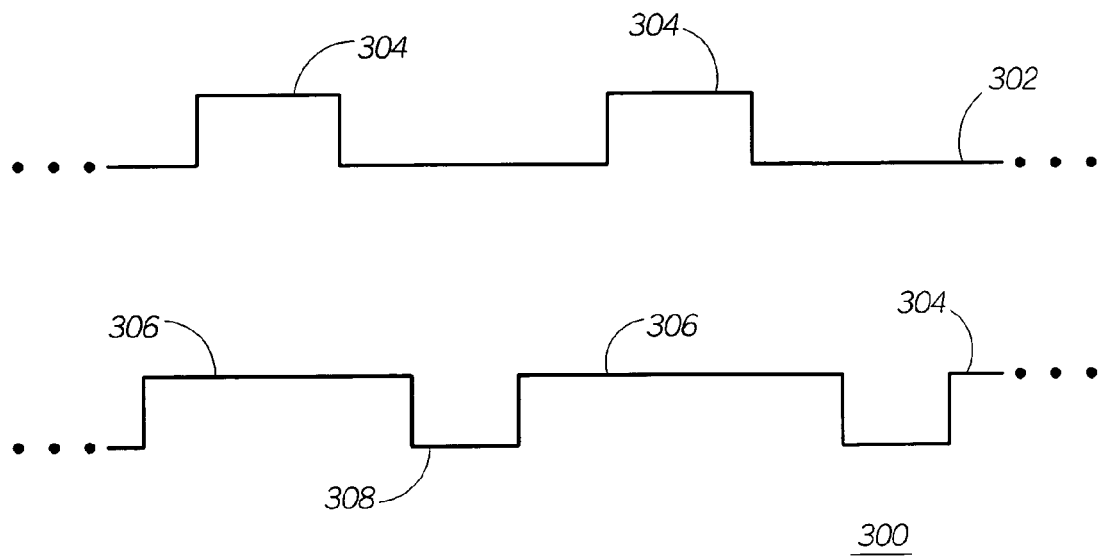

Referring now to FIGS. 2 and 3, there is shown timing diagrams 200, 300, respectively, of signals for suppressing operation of a camera module in a mobile communication device in accordance with an embodiment of the invention. In the first timing diagram 200, a video sync signal 202 indicates when the camera is outputting data to the display controller. In addition to the video sync signal, there is image information, in YUV or RGB format, for example, as well as other standard camera signals such as a horizontal sync pulse HSYNC, and clock CLK, as is well known. With each pulse 204 of the video sync signal, another image arrives at the display controller for displaying on the display. The series of images provides a viewfinder function that allows the user of the mobile communication device to see what the camera is focused on at the moment.

According to the invention, while the suspend signal 203 is not asserted, as at 208, the camera module operates normally when the mobile communication device is in camera mode, with the camera module producing a camera module output stream which includes image data of successively captured images. When the suspend signal is asserted, as at 206, the camera module suspends output, thereby avoiding the generation of EMI. During the assertion of the suspend signal 206, the receiver receives information during the mobile communication device's assigned time slot. The camera module may use information written in register 103 to coordinate the out of information with the expected suspend signal activity.

In another embodiment of the invention, illustrated in FIG. 3, the video sync 302 line shows the display rate as indicated by the periodic pulses 304. The capture rate, being the rate at which images are captured, may be higher, but by not transferring every frame to the display driver, there are periods of inactivity between images in the camera module output stream. The receive signal line 304 indicates when the mobile communication device is to receive information in its assigned time slot. Most of the time the receive signal is not asserted 306. When it is asserted 308, the assigned time slot has occurred and the mobile communication device is receiving information. The receive signal may be used as the suspend signal to control camera module operation. Alternatively, it is contemplated that the display rate is selected such that the periods in inactivity between outputting data to the display controller coincide with the time slot rate, and where the receive signal line is used to periodically correct or offset the display rate so that the periods between images continue to coincide with the receive time slots. The higher the capture rate is with relation to the display rate, the larger the periods on inactivity become.

It is contemplated that during the occurrence of one of the video sync pulses 204, 304 a receive slot may or other receive event may occur. When a video sync event conflicts with a receive event, upon assertion of the suspend signal camera module will abort the present activity and stop data transfer to the display controller. Normal operation resumes upon expiration of the receive event.

Figure 4:
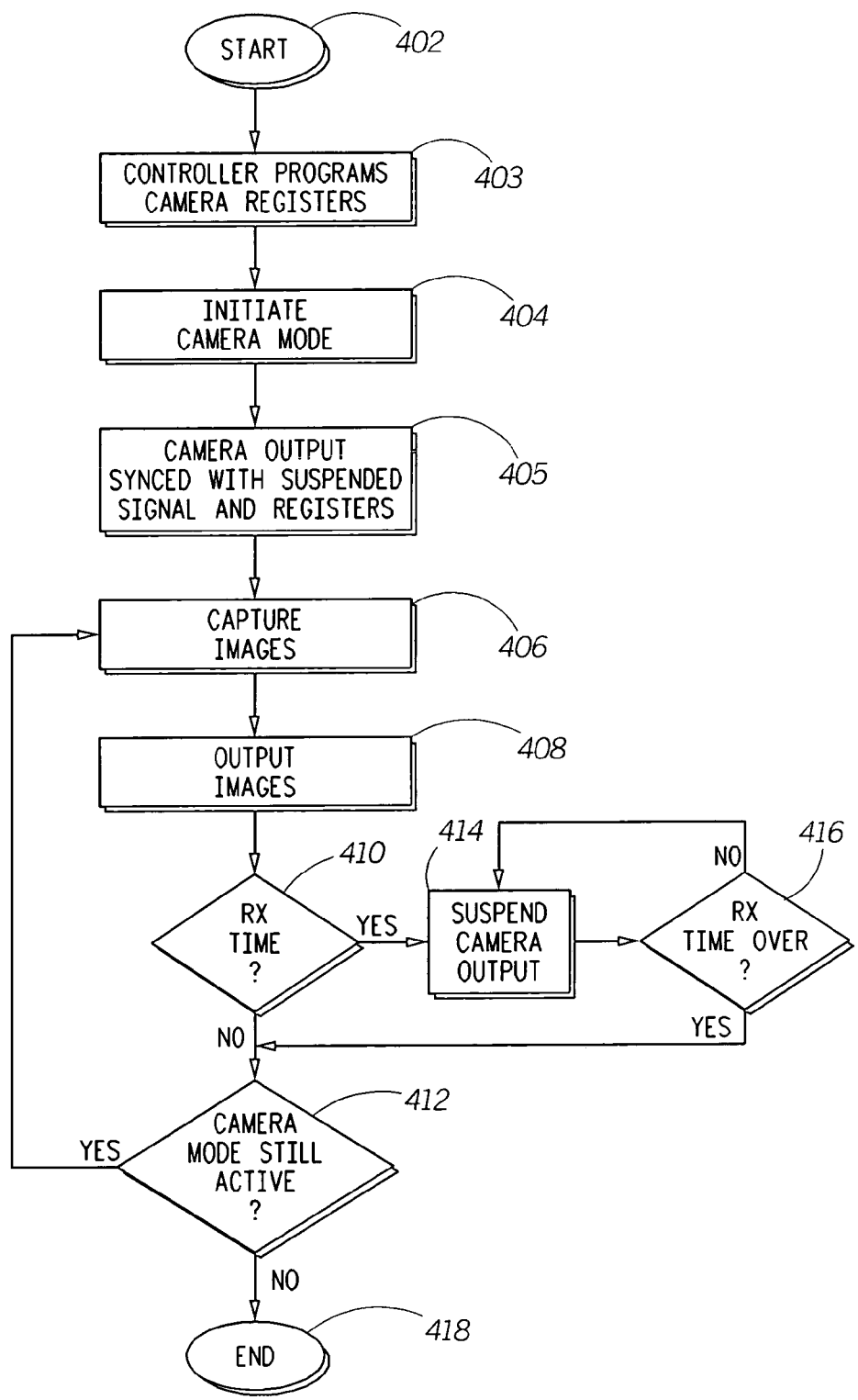
FIG. 4 shows a flow chart diagram of a method of controlling the effect of electromagnetic interference from a camera module of a mobile communication device on a radio frequency receiver of the mobile communication device, in accordance with an embodiment of the invention.

Referring now to FIG. 4, there is shown a flow chart diagram 400 of a method of controlling the effect of electromagnetic interference from a camera module of a mobile communication device on a radio frequency receiver of the mobile communication device, in accordance with an embodiment of the invention. At the start 402, the mobile communication device is powered up, and may be engaged in a call where it will be receiving information. If the camera module has a writable register 103, then the baseband processor may write information in the register 403. Furthermore, the mobile communication device has been placed in a camera mode 404, causing the mobile communication device to start displaying the stream of images coming from the camera module on the display of the mobile communication device. Upon initiating camera mode, the camera module may synchronize its output with the suspend signal via information written in a register of the camera module 405. As such, the camera module commences capturing images 406. The images are captured at a capture rate. The capture rate is limited by the rate at which images can be captured by the camera module, which is the fastest capture rate possible for a given camera module. Typically in mobile communication device applications the camera module operates at a capture rate of 30 frames per second. Upon commencing with capturing images, the camera module begins outputting the images to the display controller in a camera module output stream. As a result of the camera module suspending output during receive slot time periods, the display rate will effectively be less than the capture rate. After commencing outputting images to the display controller, upon the occurrence of a receive time slot 410, camera operation is suspended 414 until the receiver time slot is over 416. While the camera mode is still active 412, the method continues capturing images 406 and outputting them to the display controller 408, and so on. The method terminates 418 when the camera mode is no longer active.

Therefore the invention provides a method of controlling operation of a camera system in a mobile communication device, commencing upon initiating a camera mode on the mobile communication device. Once the camera mode is initiated, the camera module or system commences capturing images. The images are captured at a capture rate, and thereby produces a camera module output stream. The output stream is used for transferring the images from the camera module to a display of the mobile communication device. Alternatively, or additionally, the images may be transferred to a video codec for compression. The images are transferred at a display rate. The display rate is less than the capture rate, which results in there being periods of inactivity in the camera module output stream. The method further includes receiving information at a receiver of the mobile communication device during a receive time slot of a time division multiple access air interface. The time slot occurs during a period of inactivity of the camera module output. In one embodiment of the invention it is contemplated that the display rate may be half the capture rate. Furthermore, the capture rate may be 30 frames per second. As a result, the period of inactivity in the camera module output stream may be at least 15 milliseconds in duration. Furthermore, the method may include suspending operation of the camera module during the receive time slot, such as by the assertion of a suspend signal to the camera module.

The invention further provides method of controlling the effect of EMI from a camera module of a mobile communication device on a radio frequency receiver of the mobile communication device, commencing by producing a camera module output stream from a camera module of the mobile communication device, where the camera module output stream is a series of images captured by the camera module. The method further comprises suspending operation of the camera module upon the occurrence of a receive time slot of a time division multiple access air interface. To provide a viewfinder function, the method may further comprise displaying the series of images of the camera module output stream on a display of the mobile communication device. One means of suspending operation of the camera module comprises asserting a suspend signal at the camera module. The suspend signal may be asserted by a baseband processor of the mobile communication device.

The invention further provides for a mobile communication device having a camera module coupled to a display controller, which is coupled to a display for displaying information received from the camera module. The mobile communication device also has a receiver for receiving a signal at a prescribed time slot, and a controller for suspending operation of the camera module during the prescribed time slot. The controller may be, for example, a baseband processor of the mobile communication device.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of controlling operation of a camera system in a mobile communication device, comprising:
    initiating a camera mode on the mobile communication device;
    capturing images at a camera module of the mobile communication device at a capture rate thereby producing a camera module output stream;
    transferring the images from the camera module to a display of the mobile communication device at a display rate, thereby providing periods of inactivity in the camera module output stream; and
    receiving information at a receiver of the mobile communication device during a receive time slot of a time division multiple access air interface, and wherein the time slot occurs during a period of inactivity of the camera module output.

2. A method of controlling operation of a camera as defined in claim 1, wherein the display rate is half the capture rate.

3. A method of controlling operation of a camera as defined in claim 2, wherein the capture rate is 30 frames per second.

4. A method of controlling operation of a camera as defined in claim 1, wherein the period of inactivity in the camera module output stream is at least 15 milliseconds in duration.

5. A method of controlling operation of a camera as defined in claim 1, further comprising suspending operation of the camera module during the receive time slot.

6. A method of controlling operation of a camera as defined in claim 1, wherein transferring the images from the camera module to the display is performed where the display rate is less than the capture rate.

7. A method of controlling the effect of electromagnetic interference (EMI) from a camera module of a mobile communication device on a radio frequency (RF) receiver of the mobile communication device, comprising:

producing a camera module output stream from a camera module of the mobile communication device, the camera module output stream being a series of images captured by the camera module; and suspending operation of the camera module upon the occurrence of a receive time slot of a time division multiple access air interface;

wherein producing the camera module output stream comprises capturing images at capture rate and outputting them in the camera module output stream at a display rate, wherein the display rate is less than the capture rate, thereby providing periods of inactivity in the camera module output stream, and wherein suspending operation of the camera module occurs as a result of one of the periods of inactivity.

8. A method of controlling the effect of EMI, as defined in claim 7, further comprising displaying the series of images of the camera module output stream on a display of the mobile communication device.

9. A method of controlling the effect of EMI, as defined in claim 7, wherein suspending operation of the camera module comprises asserting a suspend signal at the camera module.

10. A method of controlling the effect of EMI, as defined in claim 9, wherein the suspend signal is asserted by a baseband processor of the mobile communication device.

11. A mobile communication device, comprising:
    a camera module;
    a display controller coupled to a display and to the camera module for displaying information received from the camera module on the display;
    a receiver for receiving a signal at a prescribed time; and
    a controller for suspending operation of the camera module during the prescribed time slot;
    wherein the camera module captures images a capture rate, and outputs them to the display controller at a display rate, and wherein the display rate is less than the capture rate.

12. The mobile communication device of claim 11, wherein the controller for suspending operation of the camera module is a baseband processor of the mobile communication device.

* * * * *